No. 839,488. PATENTED DEC. 25, 1906.
E. H. LANIER & F. K. DRIESBACH.
CONFECTION APPARATUS.
APPLICATION FILED OCT. 26, 1905.

2 SHEETS—SHEET 1.

Witnesses
J. G. Stinkel
B. C. Rust

Inventors
Edward H. Lanier and
Frank K. Driesbach
by Foster Freeman Watson
Attorneys No. 839,488. PATENTED DEC. 25, 1906.
E. H. LANIER & F. K. DRIESBACH.
CONFECTION APPARATUS.
APPLICATION FILED OCT. 26, 1905.

2 SHEETS—SHEET 2.

Witnesses
JG Hinkel
BC Rust

Inventors
Edward H. Lanier and
Frank K. Driesbach
by Foster Freeman Watson
Attorneys

UNITED STATES PATENT OFFICE.

EDWARD H. LANIER AND FRANK K. DRIESBACH, OF MEMPHIS, TENNESSEE.

CONFECTION APPARATUS.

No. 839,488.  Specification of Letters Patent.  Patented Dec. 25, 1906.

Application filed October 26, 1905. Serial No. 284,563.

*To all whom it may concern:*

Be it known that we, EDWARD H. LANIER and FRANK K. DRIESBACH, citizens of the United States, and residents of Memphis, Shelby county, Tennessee, have invented certain new and useful Improvements in Confection Apparatus, of which the following is a specification.

The present invention relates to improvements in confection apparatus, and is particularly designed for preparing the outer shell or container of the confection known as "Parisian ice-cream cones," which confection consists of a cone-shaped shell or container of pastry and a filling of ice-cream. Heretofore such pastry shells or containers have been produced by cooking a batter in a suitable oven to provide a thin disk or cake and while such cake is hot wrapping or bending the same about a conical former. This method is objectionable because of the fact that the pastry must be handled while hot and also because it is difficult to rapidly and accurately measure the quantity of batter supplied to the oven at each operation. Therefore the containers are often imperfect, varying in thickness and frequently not being uniformly cooked.

The object of the present invention is to provide means by which such pastry cones may be produced with a minimum amount of manual labor and to avoid the necessity of an operator handling the cone until it is completely formed.

A further object of the invention is to provide means by which all of the cones will be of uniform thickness, &c.

The invention is illustrated in the accompanying drawings, in which—

Figure 1:
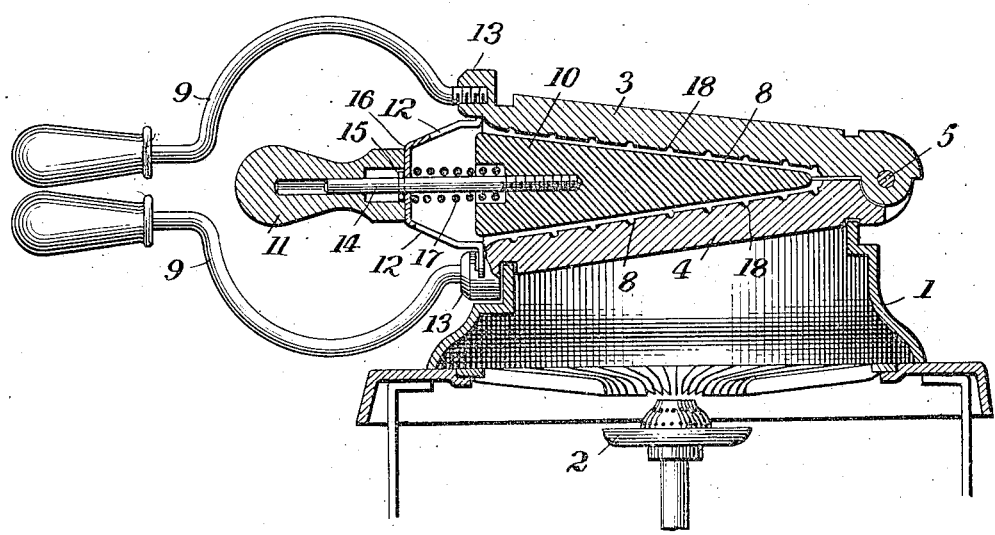
Figure 2:
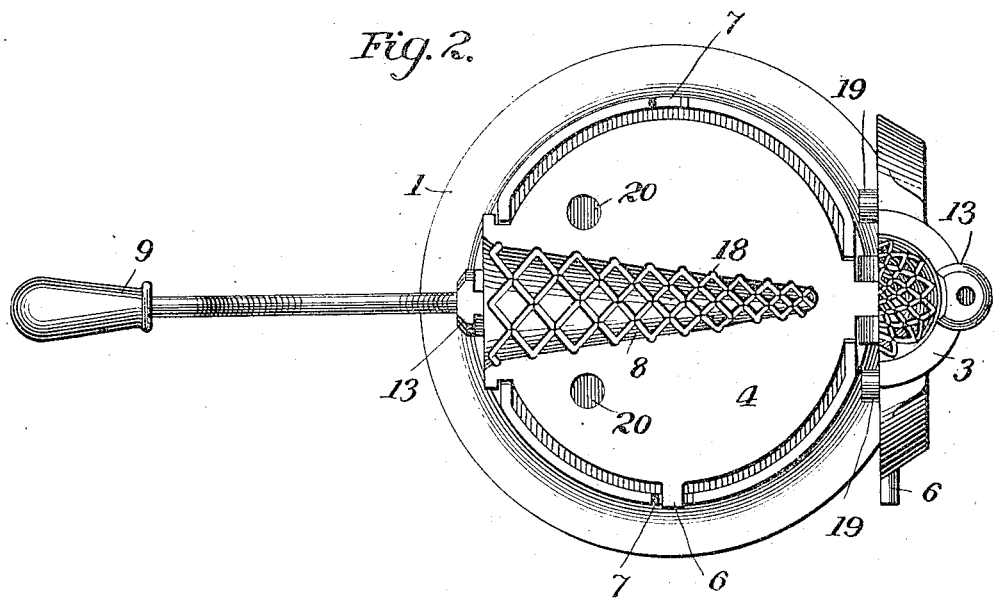
Figure 3:
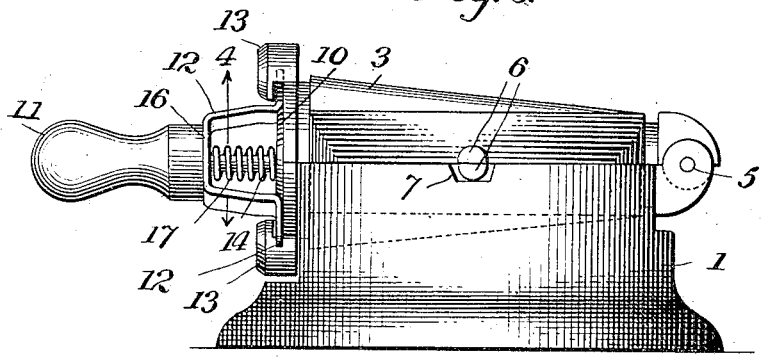
Figure 4:
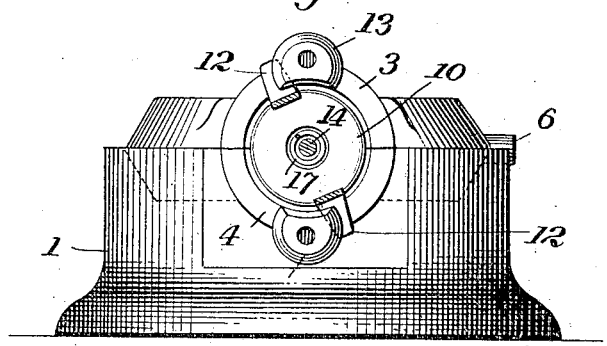
Figure 5:
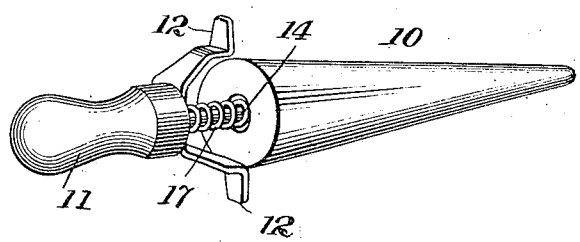

Figure 1 is a longitudinal sectional view through an apparatus constructed in accordance with this invention. Fig. 2 is a plan view, the upper section of the oven being raised. Fig. 3 is a side elevation. Fig. 4 is a view on the line 4 4 of Fig. 3, and Fig. 5 is a detail view of the core-piece.

Referring to the drawings, it will be seen that the apparatus comprises a sectional oven having formed between its sections when the latter are brought together a conical-shaped chamber which opens through the side of the oven and a former or core-piece adapted to be removably supported within said chamber of the oven. The oven is supported to rock about a horizontal axis by a suitable frame 1, below or within which may be arranged a burner or other source of heat 2. In the embodiment of the invention illustrated this heating device is represented as a gasolene-burner; but it will be understood that the frame 1 may be placed over the firebox of a suitable stove or the oven heated in any desired manner. The oven illustrated consists of two similarly-shaped sections 3 4, which are hinged together at one side, as at 5, and mounted on the frame 1, so that the oven may be rocked about a horizontal axis to bring either section thereof adjacent the burner 2, the oven being supported in a horizontal position by lugs 6, adapted to extend into either of a pair of notches 7, formed at diametrically opposite points in the upper edge of the circular wall of the supporting-frame. In each section of the oven is formed a recess or socket 8, which extends to the periphery of the section at a point opposite the hinge 5 and is gradually reduced in width and depth from its outer end toward the opposite inner end, said recesses forming when the oven-sections are brought together a chamber which is substantially conical in form and has its larger end opening through the side wall of the oven.

Each section of the oven is provided with a handle 9, by means of which the oven may be rocked about its bearings in the frame 1 and the upper section elevated or lifted from the lower section, as shown in Fig. 2.

A conical core-piece 10 is adapted to be supported within said chamber of the oven, the dimensions of said core-piece being such that it may be readily inserted in said chamber and when in position therein will be separated slightly from the oven-wall. Said core-piece is provided with a handle 11, from which project a pair of radial arms 12, adapted to engage recesses formed in lugs 13, projecting from the oven on opposite sides of the mouth of the aforesaid chamber, said arms serving to support the core-piece in proper position within the oven. The handles 9 of the oven-sections are curved or bowed in order that the core-piece may be inserted in the oven-chamber when the sections of the oven are in their closed position.

In using the apparatus the core-piece 10, which is preferably made of metal and has a smooth surface, is dipped in the batter or otherwise provided with a thin coating of such batter and then inserted in the chamber of the oven. During the cooking operation the water contained in the batter is driven off, and considerable pressure is exerted on the core by the steam that is generated during such cooking. To prevent such pressure from damaging the pastry on the core, the latter is so connected with its handle as to move longitudinally without being disengaged from the oven. As shown, a stem or rod 14 is rigidly secured to the core-piece and extends into a socket formed in the handle 11, said handle being held in position on the rod 14 by a key or pin 15 within said socket and the plate 16, carrying the aforesaid arms 12, which plate is, by means of screws or otherwise, suitably attached to the handle. About the rod or shank 14, between the core 10 and plate 16, is arranged a coiled spring 17. This construction permits the core-piece to move longitudinally within the oven without disengaging the connection between the arms 12 and lugs 13 by which said core-piece is supported.

Preferably a series of intersecting grooves or kerfs 18 are formed in the wall of the oven-chamber, said kerfs serving both to assist the escape of steam generated during the cooking and also giving to the finished cone an ornamental appearance. The rib-like projections formed on the cone by said kerfs act to strengthen the article and permit it to be made of a minimum thickness, while having the necessary strength to permit of its being freely handled after it is removed from the core 10. When the sections of the oven are brought together, pins or studs 19 on the section 3 thereof enter suitable sockets 20, formed in the section 4.

In using the apparatus it is desirable to occasionally apply a slight coating of suitable lubricant to the wall of the oven-chamber to positively prevent the pastry from adhering to said wall.

The manner of using the apparatus will be clear from the foregoing description in connection with the drawings. It will be seen that the operator is not required to handle the pastry cone unless it be to remove the same from the core-piece after the baking operation, and this is generally unnecessary, as the cone will readily slip from the core-piece when the latter is held in a vertical position.

Although the pastry cones produced by this apparatus are particularly adapted for the use before stated — that is, to be filled with ice-cream — it is evident that they may be used as containers for various substances.

It will be understood that the spring 17 acts to normally hold the core-piece in position within the oven, and after said core is moved longitudinally by pressure exerted from within the oven it will be instantly and automatically returned to its original position by said spring.

The core is of course heated while within the oven and acts to cook the cone from the interior, while the exterior is being heated by the walls of the oven. The core being heated also acts to cause the batter to adhere thereto when it is dipped into a receptacle containing the batter, and by this means the batter coating is maintained of the desired thickness. By this means it is found that a great saving in batter is effected from that required when making such cones by the method heretofore followed. This of course is of considerable advantage, as it materially reduces the expense of manufacture.

The apparatus herein described and illustrated may of course be modified in several particulars without departing from the invention. For instance, the kerfs or grooves 18 may be of different form and relative arrangement from that shown and the core-piece supported within the oven by different means from those illustrated. The form of the oven-chamber and of the core-piece may also be varied, if desired.

Having thus described the invention, what is claimed is—

1. An apparatus for the purpose described comprising an oven having a chamber of conical form, a core-piece corresponding in form to the oven-chamber, and means projecting beyond opposite sides of the core-piece and adapted to engage the oven to support the core-piece in the oven-chamber.

2. An apparatus for the purpose described comprising an oven, a conical core-piece adapted to be inserted in the oven, a handle connected with the outer end of said core-piece, and means for engaging the oven on opposite sides of the handle and core-piece to support the latter in the oven.

3. An apparatus for the purpose described, comprising an oven, a core-piece, and means connected with the core-piece and adapted to engage the oven to support the core-piece therein, the connection between said supporting means and core-piece permitting the latter to move longitudinally of the oven without moving the supporting means.

4. An apparatus for the purpose described comprising an oven, a core-piece, and arms projecting radially beyond opposite sides of said core-piece and adapted to engage the oven to support the core-piece therein.

5. An apparatus for the purpose described comprising an oven, a core-piece adapted to be inserted in the oven, a handle, and means connecting the handle and core-piece and permitting the latter to move relative to the handle and oven while supported in the latter.

6. An apparatus for the purpose described comprising an oven, a core-piece, a handle connected with the core-piece by means permitting the latter to move relative to the handle, and means connected with the handle and adapted to engage the oven to support the core-piece therein.

7. An apparatus for the purpose described, comprising an oven formed of two sections hinged together, means for supporting said oven and permitting it to be turned to bring either section adjacent a suitable heating means, a core-piece adapted to be inserted in the oven, and a handle connected with the core-piece and provided with means for engaging the oven on opposite sides of the core-piece to support the latter therein.

8. An apparatus for the purpose described, comprising an oven formed of two sections hinged together, means for supporting said oven and permitting it to be turned about a horizontal axis to bring either section adjacent a suitable heating means, a core-piece adapted to be inserted in the oven, and a handle connected with the core-piece and extending beyond the oven and provided with means for engaging the oven to support the core-piece therein.

9. The herein-described confection apparatus comprising an oven, and a core-piece including a body adapted to extend into the oven, radially-projecting means for engaging the oven and supporting said body therein, and a spring for yieldingly holding said body in position in the oven.

10. The herein-described confection apparatus comprising an oven, a core-piece adapted to extend into the oven, a handle having means for engaging the oven, a rod connected with the core-piece and extending into a socket in the handle, and a spring interposed between the handle and core-piece.

In testimony whereof we affix our signatures in presence of two witnesses.

EDWARD H. LANIER.
FRANK K. DRIESBACH.

Witnesses:
  ARTHUR L. BRYANT,
  EDWIN S. CLARKSON.